(12) United States Patent
Ehlmann et al.

(10) Patent No.: US 10,972,046 B2
(45) Date of Patent: Apr. 6, 2021

(54) CIRCUITS AND METHODS FOR CONTROLLING CURRENT IN A PARALLEL-CONNECTED ARRAY

(71) Applicant: SUNPOWER CORPORATION, San Jose, CA (US)

(72) Inventors: Jonathan L. Ehlmann, Austin, TX (US); Lee J. Gorny, Mountain View, CA (US); Thierry H. Nguyen, San Francisco, CA (US); David C. Okawa, Belmont, CA (US)

(73) Assignee: SunPower Corporation, San Jose, CA (US)

( * ) Notice: Subject to any disclaimer, the term of this patent is extended or adjusted under 35 U.S.C. 154(b) by 180 days.

(21) Appl. No.: 16/119,665

(22) Filed: Aug. 31, 2018

(65) Prior Publication Data

US 2019/0074795 A1 Mar. 7, 2019

Related U.S. Application Data

(60) Provisional application No. 62/553,537, filed on Sep. 1, 2017.

(51) Int. Cl.
| | |
|---|---|
| *H02S 20/25* | (2014.01) |
| *H02S 40/36* | (2014.01) |
| *H02J 3/38* | (2006.01) |
| *H02S 40/34* | (2014.01) |
| *H02S 20/23* | (2014.01) |
| *H02S 40/32* | (2014.01) |

(52) U.S. Cl.
CPC .............. *H02S 40/36* (2014.12); *H02J 3/383* (2013.01); *H02S 20/23* (2014.12); *H02S 20/25* (2014.12); *H02S 40/32* (2014.12); *H02S 40/34* (2014.12)

(58) Field of Classification Search
CPC .......... H02S 40/36; H02S 20/25; H02S 40/34; H02S 20/23; H02S 40/32; H02J 3/383; H02J 3/381; H02J 2300/24; Y02B 10/10; Y02E 10/56
See application file for complete search history.

(56) References Cited

U.S. PATENT DOCUMENTS

| | | | | |
|---|---|---|---|---|
| 8,695,289 | B2* | 4/2014 | Koch | H01L 31/05 |
| | | | | 52/173.3 |
| 9,412,890 | B1* | 8/2016 | Meyers | H01L 31/0504 |
| 9,966,898 | B1* | 5/2018 | Flanigan | H02S 40/34 |
| 2008/0302409 | A1* | 12/2008 | Bressler | H02S 20/25 |
| | | | | 136/251 |
| 2013/0062958 | A1* | 3/2013 | Erickson, Jr. | H02M 7/003 |
| | | | | 307/82 |
| 2017/0346292 | A1* | 11/2017 | Handelsman | H02J 7/0068 |
| 2019/0020306 | A1* | 1/2019 | Atchley | H02S 40/34 |

* cited by examiner

*Primary Examiner* — Daniel J Cavallari
(74) *Attorney, Agent, or Firm* — Grasso PLLC

(57) ABSTRACT

A solar device system includes one or more solar devices shingled into an array of solar devices. Each solar device includes one or more current generation cells configured to generate electric current, a plurality of current buses, and a control circuit configured to distribute the generated electric current to the plurality of current buses, and route the generated electric current to an adjacent solar device. Additionally, the solar device system includes an array collector electrically connected to the one or more solar devices, the array collector being configured to collect the generated electrical current from the one or more solar devices and direct the generated electrical current to an inverter or a power grid.

20 Claims, 18 Drawing Sheets

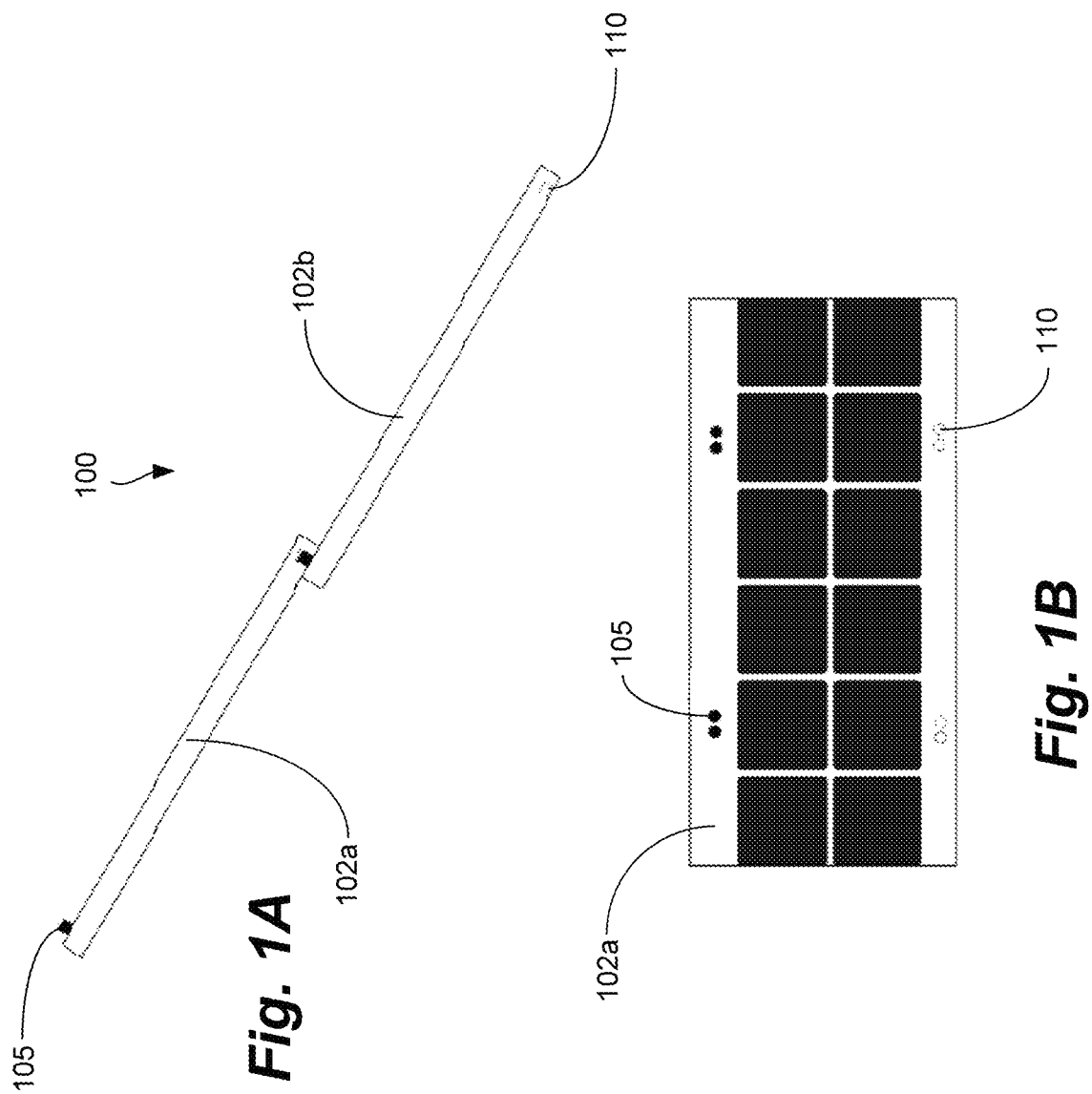

CIRCUITS AND METHODS FOR CONTROLLING CURRENT IN A PARALLEL-CONNECTED ARRAY

CROSS-REFERENCE TO RELATED APPLICATION

This application claims the benefit of U.S. Provisional Application No. 62/553,537, filed Sep. 1, 2017, which is incorporated herein by reference in its entirety.

SUMMARY

According to aspects of the disclosed subject matter, a solar device system includes one or more solar devices shingled into an array of solar devices. Each solar device includes one or more current generation cells configured to generate electric current, a plurality of current buses, and a control circuit configured to distribute the generated electric current to the plurality of current buses, and route the generated electric current to an adjacent solar device. Additionally, the solar device system includes an array collector electrically connected to the one or more solar devices, the array collector being configured to collect the generated electrical current from the one or more solar devices and direct the generated electrical current to an inverter or a power grid.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein:

FIG. 1A illustrates a side view of an example of solar shingles with connectors according to one or more aspects of the disclosed subject matter;

FIG. 1B illustrates a top view of an example of a solar shingle with connectors according to one or more aspects of the disclosed subject matter;

DESCRIPTION OF EMBODIMENTS

Figure 1C:
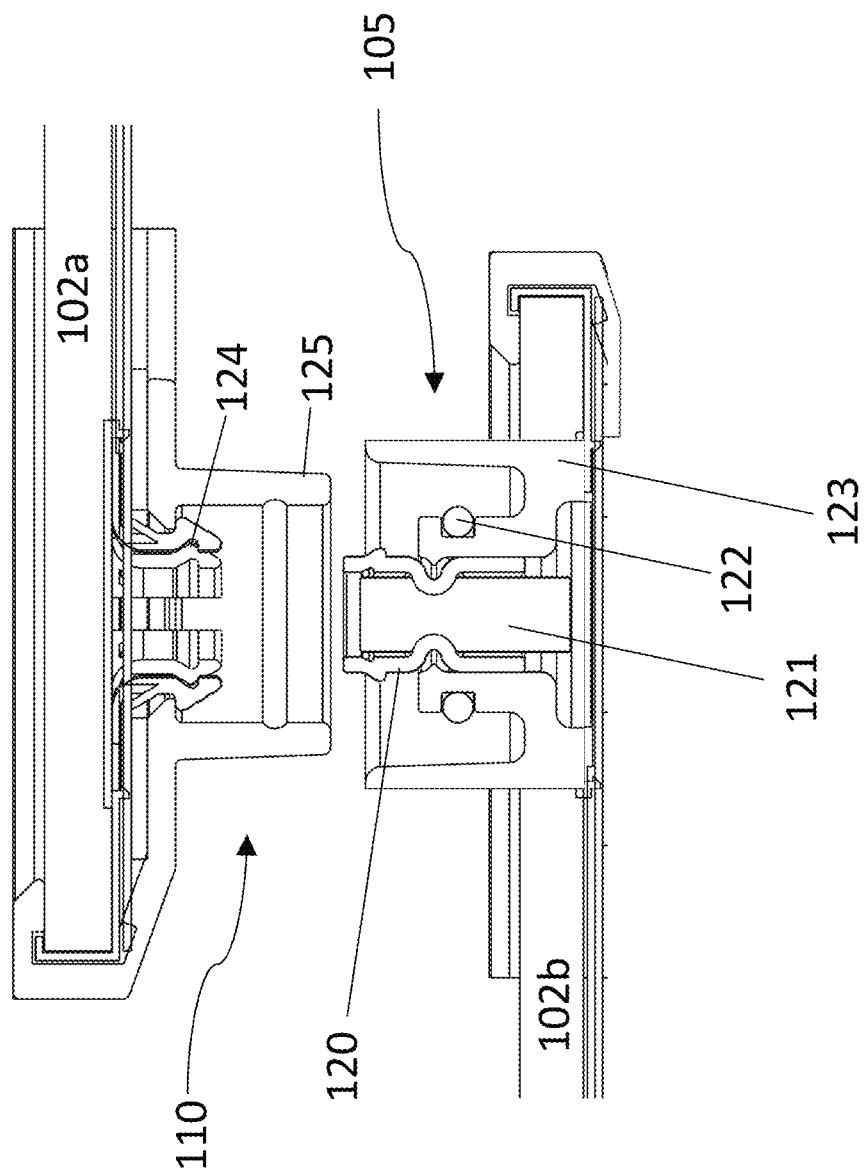
FIG. 1C illustrates a cross-sectional view of connectors in an un-mated or disconnected state according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Interest in building integrated photovoltaics (BIPV) has been growing steadily. BIPY presents new challenges for each different application. Two such examples of BIPY are: shingles and siding. Both shingles and siding have smaller area per PY element than conventional PY modules and therefore require more connections for the same power. At the same time, both shingles and sidings are installed flush making mechanical packaging of connectors and wiring difficult. Some embodiments of the disclosure simplify wiring in BIPV with applications in other areas as well.

Some embodiments take advantage of the traditional staggered installation of shingles. Each shingle has two current paths or busses that interconnect with the shingles above and below. Current from the shingle is injected into one of these two busses in a way that balances current throughout the system. Because of the staggered installation of shingles, each shingle is connected to two shingles above and two shingles below.

Aspects of the disclosure provide circuits and control methods to implement a PV shingle system that is easy to design and install. Wiring is easily packaged into a flat shingle. Current is automatically handled by electronics with the PV shingle. Electrical installation and mechanical installation are done in one step.

The present disclosure can provide system wiring in solar roofs. In some embodiments, wiring issues are addressed by automatically routing current inside the PV array. The PV shingles have multiple parallel paths into which current is selectively injected current and current throughout the PV system is balanced. The example of a solar shingle will be used for this disclosure.

Referring now to the drawings, wherein like reference numerals designate identical or corresponding parts throughout the several views:

(Currently amended) Figures IA and IB illustrate an example of solar shingles 100 with connectors according to one or more aspects of the disclosed subject matter. Each shingle (e.g., shingles 102a, 102b) is made out of a laminate with solar cells wired together and electronics than can manage current. The electrical output of the solar shingles 100 is meant to be put into parallel with the rest of the solar shingles. The bus can be at any voltage convenient for PV system design. Typical residential inverters operate to a maximum of 600 V, but other voltage may be advantageous to PV system design. The bus can be single phase ac, multi-phase ac, or dc.

Each shingle contains two of such busses that interconnect with the nearby solar shingles. Because of the staggered installation of shingles, each bus interconnects with different adjacent shingles. The solar shingle 102a in FIG. 1B has four pairs of connectors. As depicted, plugs 105 on a top side of solar shingle 102a face upwards, and sockets or receptacles 110 at the bottom side of solar shingle 102b face downwards. In other configurations, plugs can face downwards from an underside of a shingle and sockets or receptacles can face upwards from a top side of a shingle. Connectors can be locked together by one or more connection approaches including snap type locking or connection, adhesives between shingles, a press fit connection around a seal or a combination thereof. Both a conductive portion and a protective housing portion can be sealed or mated between adjacent shingles to provide both electrical connection and mechanical coupling. Connectors (e.g. a plug and receptacle pair) can be mechanically rigid relative to the shingle or laminate materials (e.g. flexible polymer shingles or panels) so as to moderate or take up stress resulting from thermal changes and/or tolerance stack up mismatches. In some approaches where the laminate is semi-rigid or rigid (e.g. containing one or more glass layers), the connectors (e.g. plug and receptacle pair) can be mechanically compliant relative to the laminate allowing each shingle or panel to move relative to another. In a fixed configuration, the laminate (e.g. encapsulant, insulating sheet, electrically conductive ribbon materials, etc.) can conform around the connector to provide strength or robustness at the point of connection. If a semi-rigid or rigid laminate is used, a connector housing can be provided as a flexible insulating housing encasing the conductive materials so as to allow them to remain in a low stress state as the top and bottom shingles move or shift relative to each other.

Connector plugs can be formed of a conductive metal (e.g. copper, aluminum, metal alloy) surrounded by an insulator (e.g. polymeric materials like PPE, PS). Connectors can be water impervious with a sealing feature to ensure electrical insulation inside of the connector or a flashed approach can be employed between top and bottom shingles effectively encapsulating the electrically active area of the shingle. In some implementations, one or more polymeric (e.g. rubber) O-rings can be included in the annular regions of the connector to secure the connection and/or provide waterproof protection. Connectors can comprise conductive materials formed of a metal or metal alloy and a housing formed of an insulating material such as a polycarbonate or other such material that is commonly used in high current electrical applications. These materials can also be provided to withstand lamination temperatures allowing them to be bonded to the shingles at the time of lamination. Glass fiber or similar composite or fill materials can be employed to extend the range of polymeric systems for this purpose.

It should be appreciated that all solar shingles 100 can have this configuration. Additionally, in this configuration, solar shingles 100 can easily plug into each other with a plug/receptacle connection protected from the environment by the overlapping shingles. It is possible for the right-side connectors to make up one electronic bus and the left-side to make up the other bus. It is also possible for the busses to crisscross diagonally. In this configuration, the upper-left plug connects to the lower-right socket and the upper-right plug connects to the lower-left socket. This allows for different current directing schemes that are advantageous to different rooftop designs. Several examples of desirable connectors are provided below.

Figure 1D:
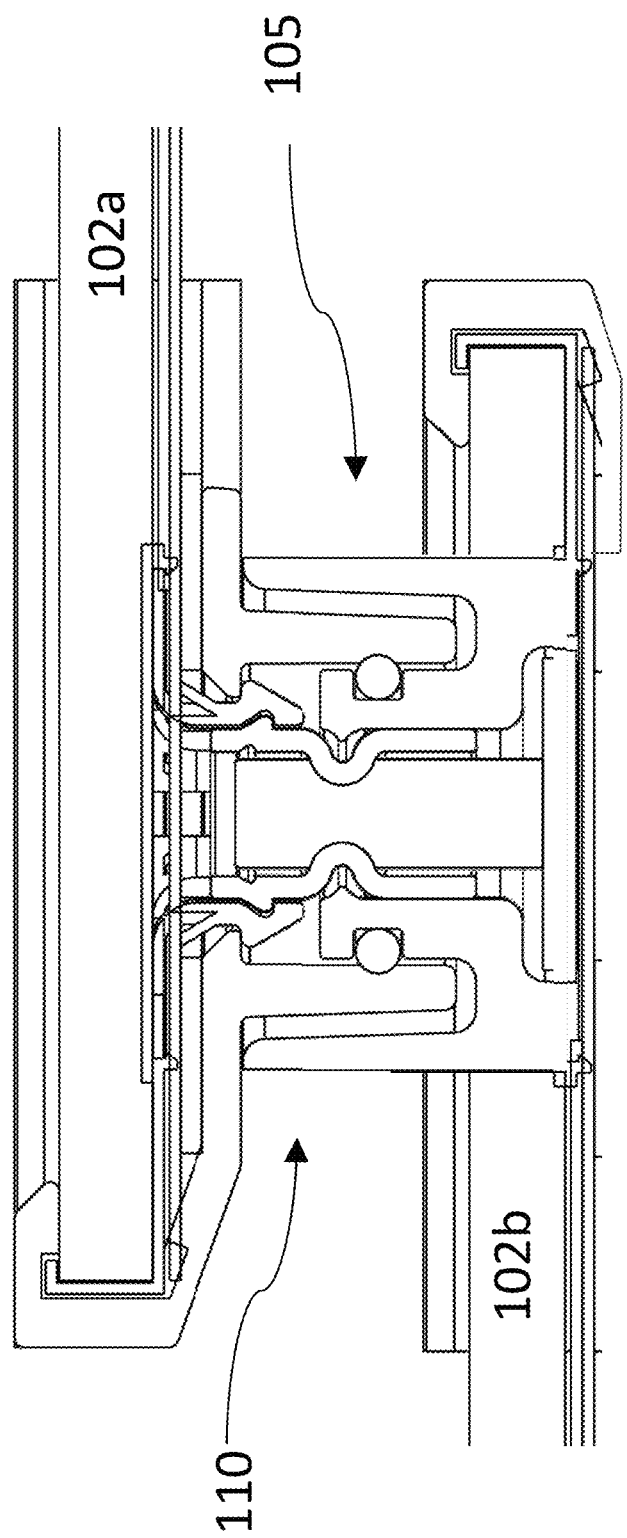
FIG. 1D illustrates a cross-sectional view of connectors in a mated or connected state according to one or more aspects of the disclosed subject matter.

A button-type connector can be used to electrically interconnect shingles, for example as shown in FIGS. 1C and 1D. FIG. 1C shows a cross-sectional view of connectors in an un-mated or disconnected state, and FIG. 1D shows a cross-sectional view of connectors in a mated or connected state, according to an embodiment. Plug 105 on top side of solar shingle 102b faces upwards to mate with socket or receptacle 110 facing downwards at underside of solar shingle 102a. In other implementations, a plug can be provided at an underside of a solar shingle and a receptacle can be provided at a top side of shingle. Plug 105 can comprise plug contact 120 (e.g. male button ferrule crimped and/or soldered) and plug laminate ribbon spring 121 (e.g. ribbon crimped in ferroule) which can be electrically coupled to current generating solar cells of shingle 102b. Plug 105 can further comprise a connector seal 122 (e.g. rubber O-ring) seated in plug housing 123 so as to facilitate mechanical coupling between shingles 102a and 102b. Receptacle 110 can comprise receptacle contact 124 (e.g. female capturing button) surrounded by receptacle housing 125. Plug housing 123 and receptacle housing 125 can be sized and shaped for secure mechanical coupling of plug 105 and receptacle 110. Such coupling can produce a seal to protect the electrical connection from water, vibration, heating or cooling or other environmental factors. When connectors are mated as shown in FIG. 1D, plug contact 120 and receptacle contact 124 can conduct electric current between shingles 102a and 102b.

Figure 1E:
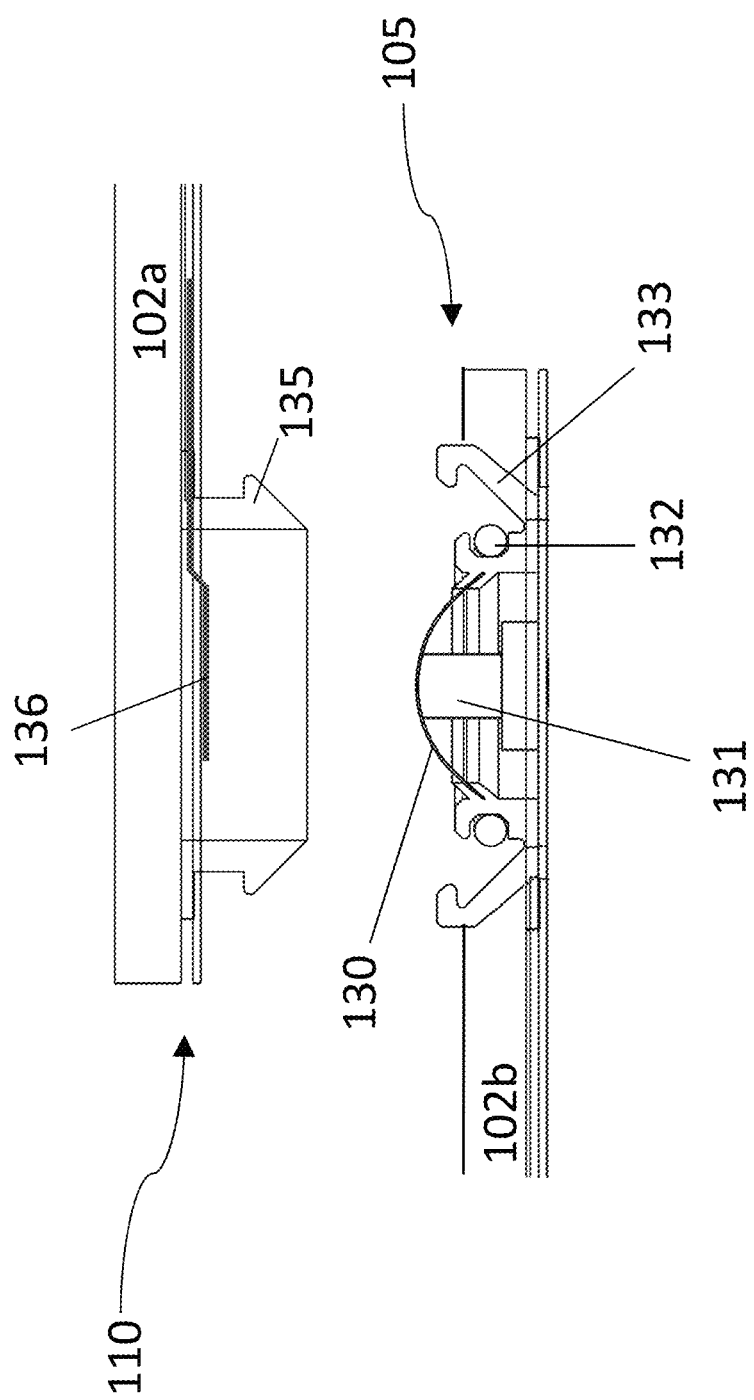
FIG. 1E illustrates a cross-sectional view of connectors in an un-mated or disconnected state according to one or more aspects of the disclosed subject matter.
Figure 1F:
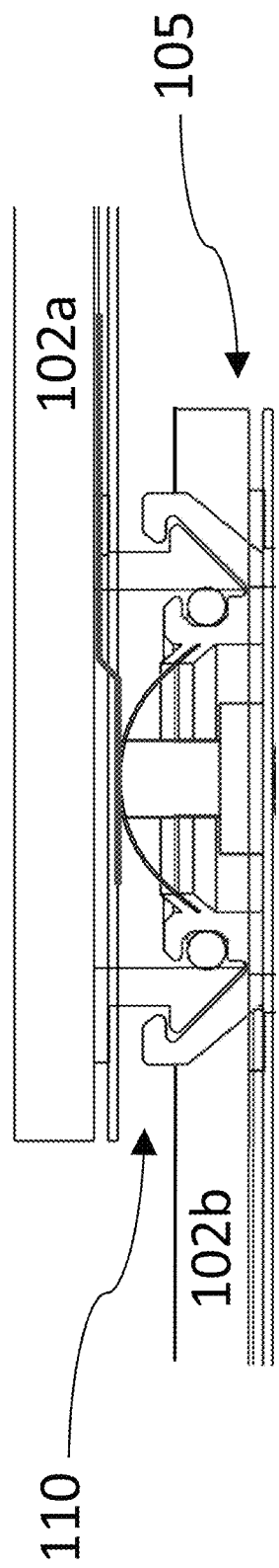
FIG. 1F illustrates a cross-sectional view of connectors in a mated or connected state according to one or more aspects of the disclosed subject matter.

A leaf spring-type connector can be used to electrically interconnect shingles, for example as shown in FIGS. 1E and 1F. FIG. 1E shows a cross-sectional view of connectors in an un-mated or disconnected state and FIG. 1F shows a cross-sectional view of connectors in a mated or connected state, according to an embodiment. Plug 105 at top side of solar shingle 102b faces upwards to mate with socket or receptacle 110 facing downwards at underside of solar shingle 102a. Plug 105 can comprise plug contact 130 (e.g. metallic leaf spring) and plug laminate ribbon spring 131 which can be electrically coupled to current generating solar cells of shingle 102b. Plug 105 can further comprise a connector seal 132 (e.g. rubber O-ring) and a plug housing 133 to facilitate mechanical coupling between shingles 102a and 102b. Receptacle 110 can comprise receptacle housing 135 surrounding a receptacle ribbon 136. Receptacle ribbon 136 can connect to current generating solar cells through a back sheet of the laminate or shingle 102a. Plug housing 133 and receptacle housing 135 can be sized and shaped for secure mechanical coupling of plug 105 and receptacle 110. When connectors are mated as shown in FIG. 1F, plug contact 130 and receptacle ribbon 136 can conduct electric current between shingles 102a and 102b.

Figure 1G:
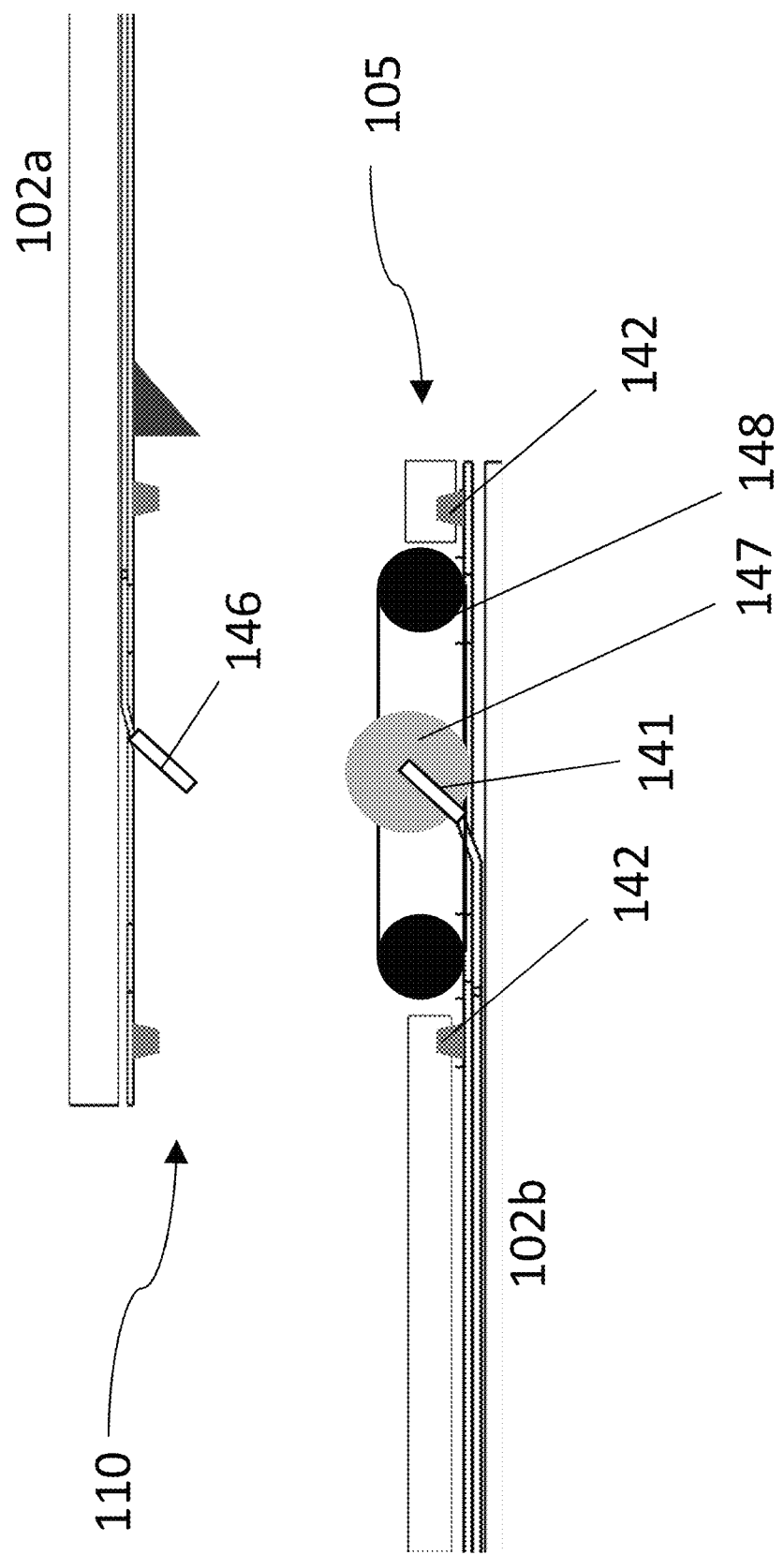
FIG. 1G illustrates a cross-sectional view of connectors in a disconnected state according to one or more aspects of the disclosed subject matter.
Figure 1H:
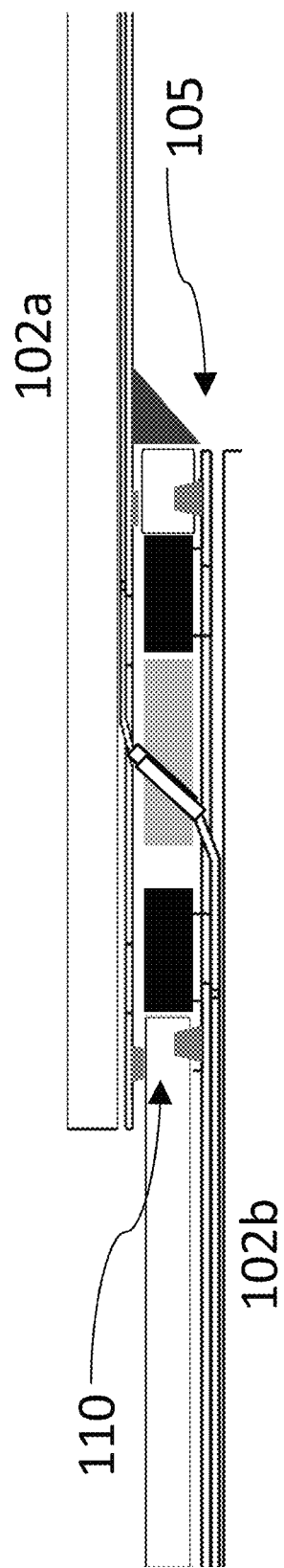
FIG. 1H illustrates a cross-sectional view of connectors in a connected state according to one or more aspects of the disclosed subject matter.

A flexible or adhesive-type connector can be used to electrically interconnect shingles, for example as shown in FIGS. 1G and 1H. FIG. 1G shows a cross-sectional view of connectors in disconnected state and FIG. 1H shows a cross-sectional view of connectors in a connected state, according to an embodiment. Plug 105 on top side of solar shingle 102b faces upwards to mate with socket or receptacle 110 facing downwards at underside of solar shingle 102a. Plug 105 can comprise a plug laminate ribbon 141 electrically coupled to current generating solar cells of shingle 102b. An adhesive or gel 147 (e.g. electrically conductive adhesive) and/or an insulating adhesive or gasket 148 can be provided around plug laminate ribbon 141. Plug 105 can further comprise a connector seal or insulating gasket 142 (e.g. rubber O-ring) to facilitate mechanical coupling and/or direct flow of adhesive between shingles 102a and 102b upon connection. Receptacle 110 can comprise a receptacle ribbon 146 connected to current generating solar cells through a back sheet of the laminate or shingle 102a. When mated, adhesive and connector seals can facilitate secure mechanical coupling between plug 105 and receptacle 110. When connectors are mated as shown in FIG. 1H, receptacle ribbons 141 and 146 can conduct electric current between shingles 102a and 102b.

Figure 1I:
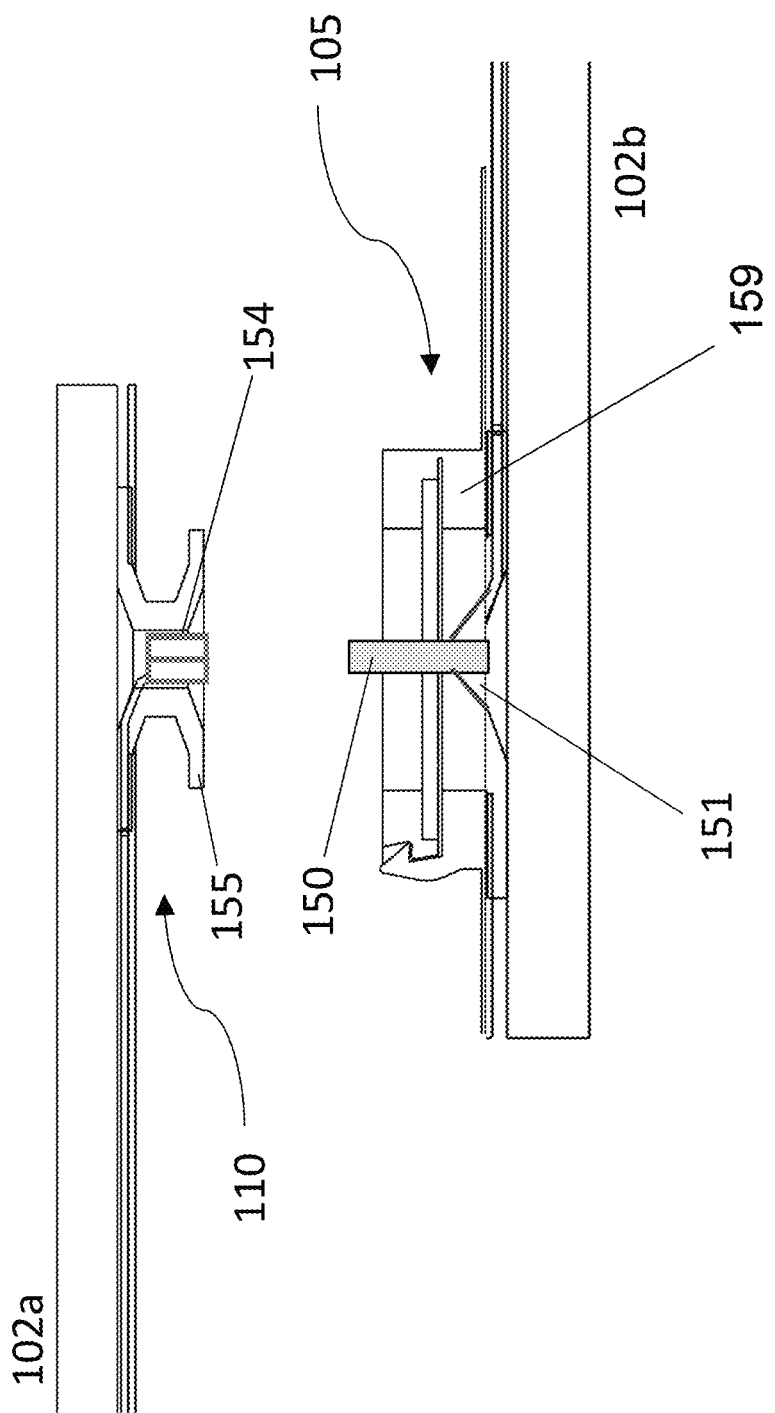
FIG. 1I illustrates a cross-sectional view of connectors in an un-mated state according to one or more aspects of the disclosed subject matter.
Figure 1J:
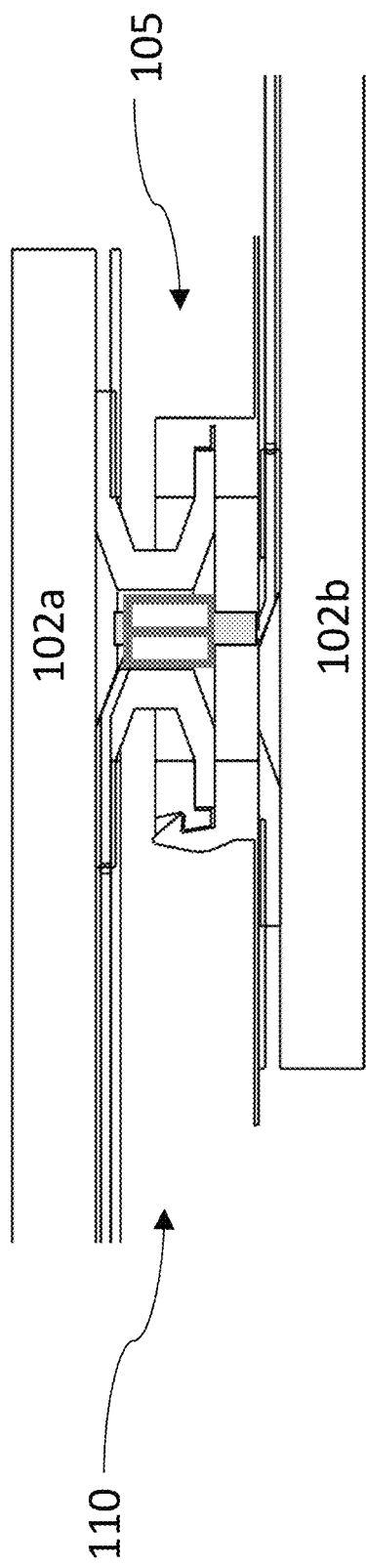
FIG. 1J illustrates a cross-sectional view of connectors in a mated state according to one or more aspects of the disclosed subject matter.

A flexible-type connector can be used to electrically interconnect shingles, for example as shown in FIGS. 1I and 1J. FIG. 1I shows a cross-sectional view of connectors in an un-mated state and FIG. 1J shows a cross-sectional view of connectors in a mated state according to an embodiment. Plug 105 on top side of solar shingle 102b faces upwards to mate with socket or receptacle 110 facing downwards at underside of solar shingle 102a. Plug 105 can comprise plug contact 150 (e.g. male button ferroule crimped and/or soldered onto electrical conductor or ribbon), plug laminate ribbon spring 151 (e.g. ribbon crimped in the ferroule) which can be electrically coupled to current generating solar cells of shingle 102b, and a plug housing 159. Plug laminate ribbon spring 151 can allow plug contact 150 to move laterally while maintaining electrical attachment to a laminate ribbon. Receptacle 110 can comprise receptacle contact 154 (e.g. female capturing button) surrounded by receptacle housing 155 which can be provided as a flexible seal element laminated into shingle 102a enabling secure mechanical coupling between plug 105 and receptacle 110. When connectors are mated as shown in FIG. 1J, plug contact 150 and receptacle contact 154 can conduct electric current between shingles 102a and 102b.

Figure 2:
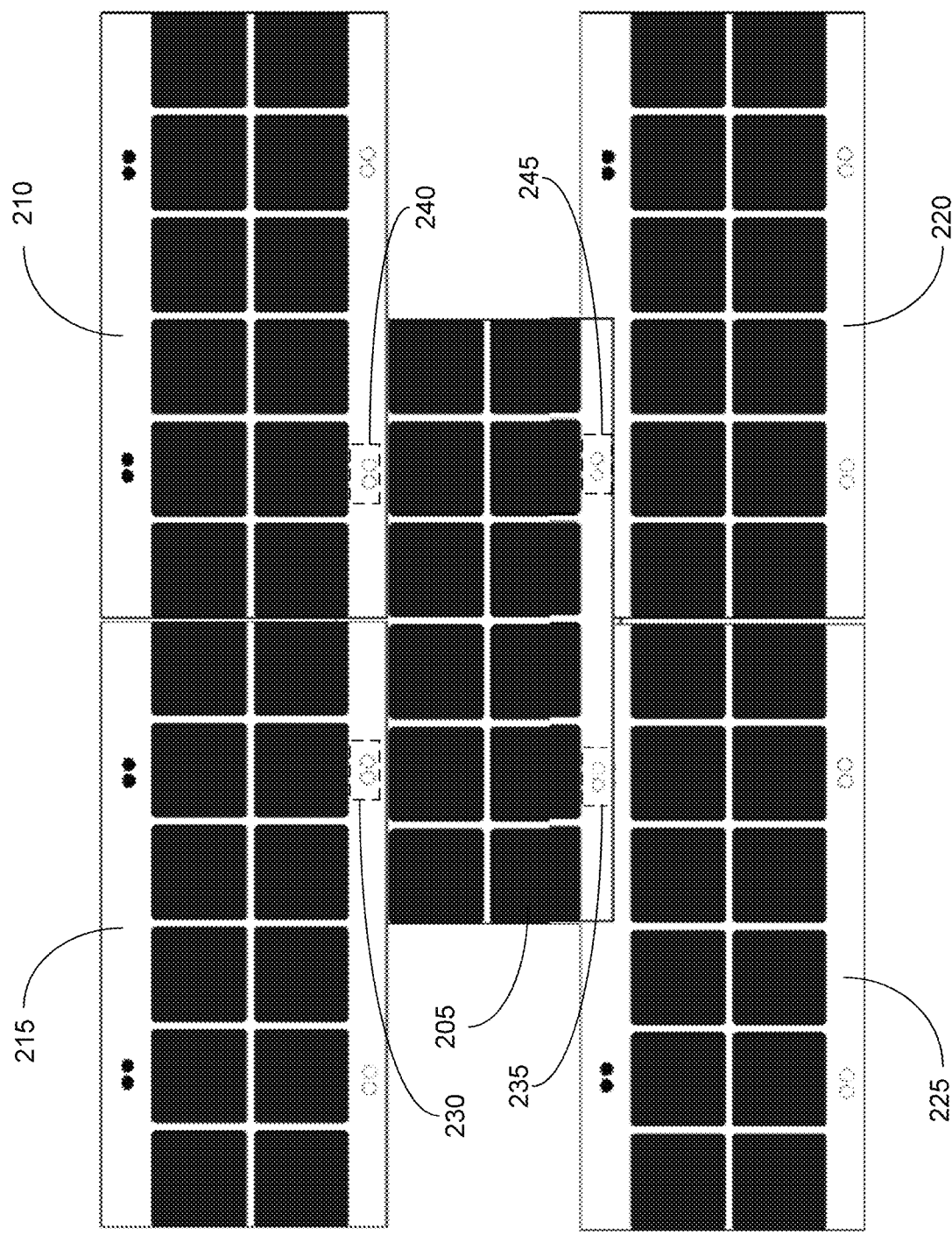
FIG. 2 illustrates an example of solar shingles attached together according to one or more aspects of the disclosed subject matter.

A single solar shingle (e.g., central shingle 205) will attach to four other solar shingles (FIG. 2). It should be appreciated that each solar shingle in FIG. 2 can be configured as solar shingle 102a as described in FIG. 1B. The shingles will be referred to by, upper-right (UR) 210, upper-left (UL) 215, lower-right (LR) 220, and lower-left (LL) 225 in relation to the central shingle 205. Additionally, with respect to each shingle, the connectors will also be referred to by upper-right (UR), upper-left (UL), lower-right (LR), and lower-left (LL). The UL shingle's LR socket attaches to the center shingle's UL plug at connection point 230. The LL shingle's UR plug attaches to the center shingle's LL socket at connection point 235. The UR shingle's LL socket attaches to the center shingle's UR plug at connection point 240. The LR shingle's UL plug attaches to the center shingle's LR socket at connection point 245. This is extended to form an array of overlapping solar shingles.

In an embodiment, the connectors on diagonals are mating connectors. The UL and LR connectors can mate together, and the UR and LL can mate together. It is not necessary that the UL and LL connectors mate, and not necessary that the UR and LR connectors mate.

Figure 3:
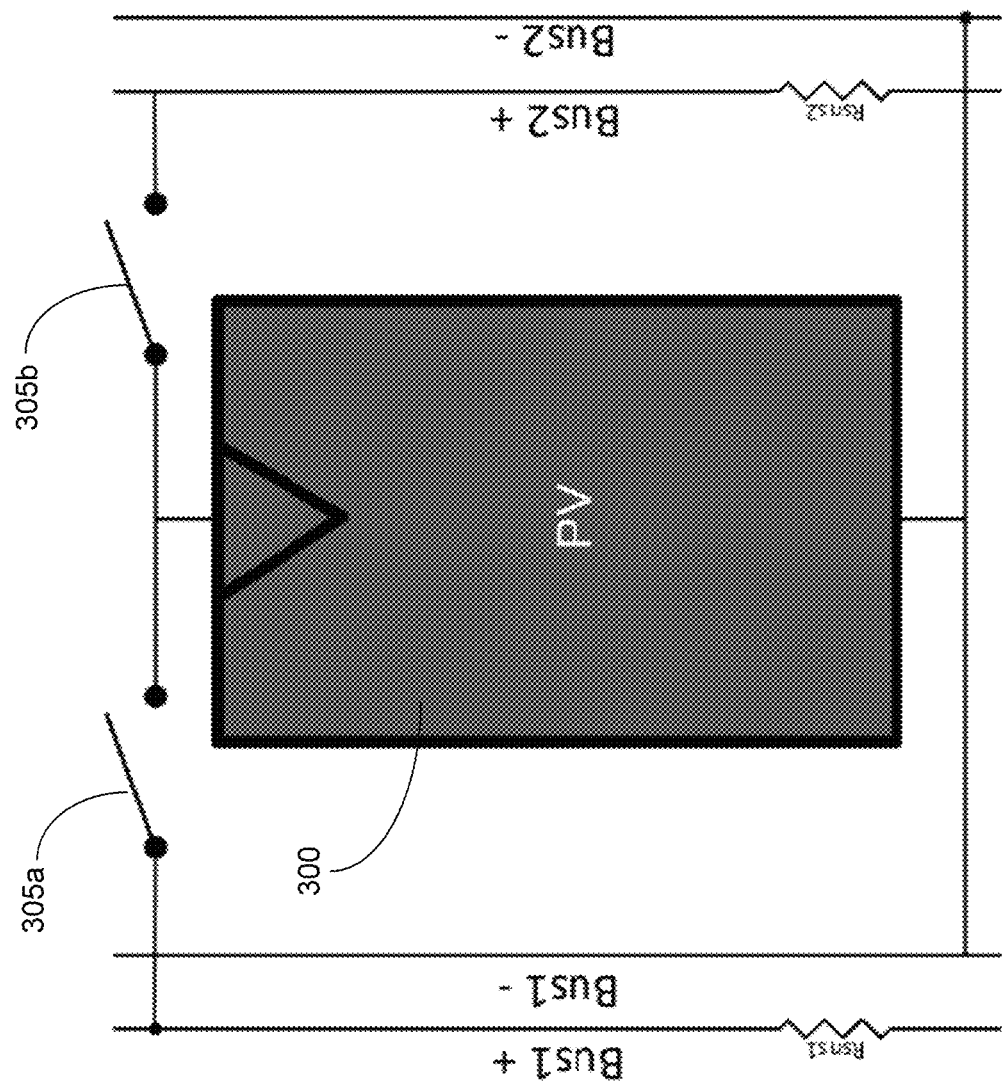
FIG. 3 illustrates an example of switched photovoltaics (PV) with sense resistors according to one or more aspects of the disclosed subject matter.

With two or more parallel busses running through the solar shingle, electronics can manage the current flow to direct the current onto the proper bus. The controller will inject current onto the bus with less current. In an embodiment, current in each bus can be measured. FIG. 3 shows a configuration of a PV module 300 where a sense resistor may be placed to measure bus current. In an example, an absolute current measurement is used to stay under a desired current limit. In another example, a differential measurement may be used to determine which bus is carrying less current. In fact, in an example, the sign of the differential measurement is used to determine which bus is carrying less current.

Regardless whether differential or absolute measurement are used to determine the lower current bus, a circuit is provided to direct current onto the proper bus. This can be done one of three ways: parallel converter, a multi-output converter, or with a set of switches. A converter-based approach enables continuous control of current onto the busses, while switch can direct 100% of current to one bus or the other. A bidirectional converter can direct current from one bus onto the other. FIG. 3 shows switches 305a, 305b that attach the PV module to either bus. In this case, the bus voltage can be equal to the Vmp of the PV module to harvest maximum power from the PV module. Both switches can be open at the same time detaching the PV module, but both switches may not be closed without shorting the busses together.

Figure 4:
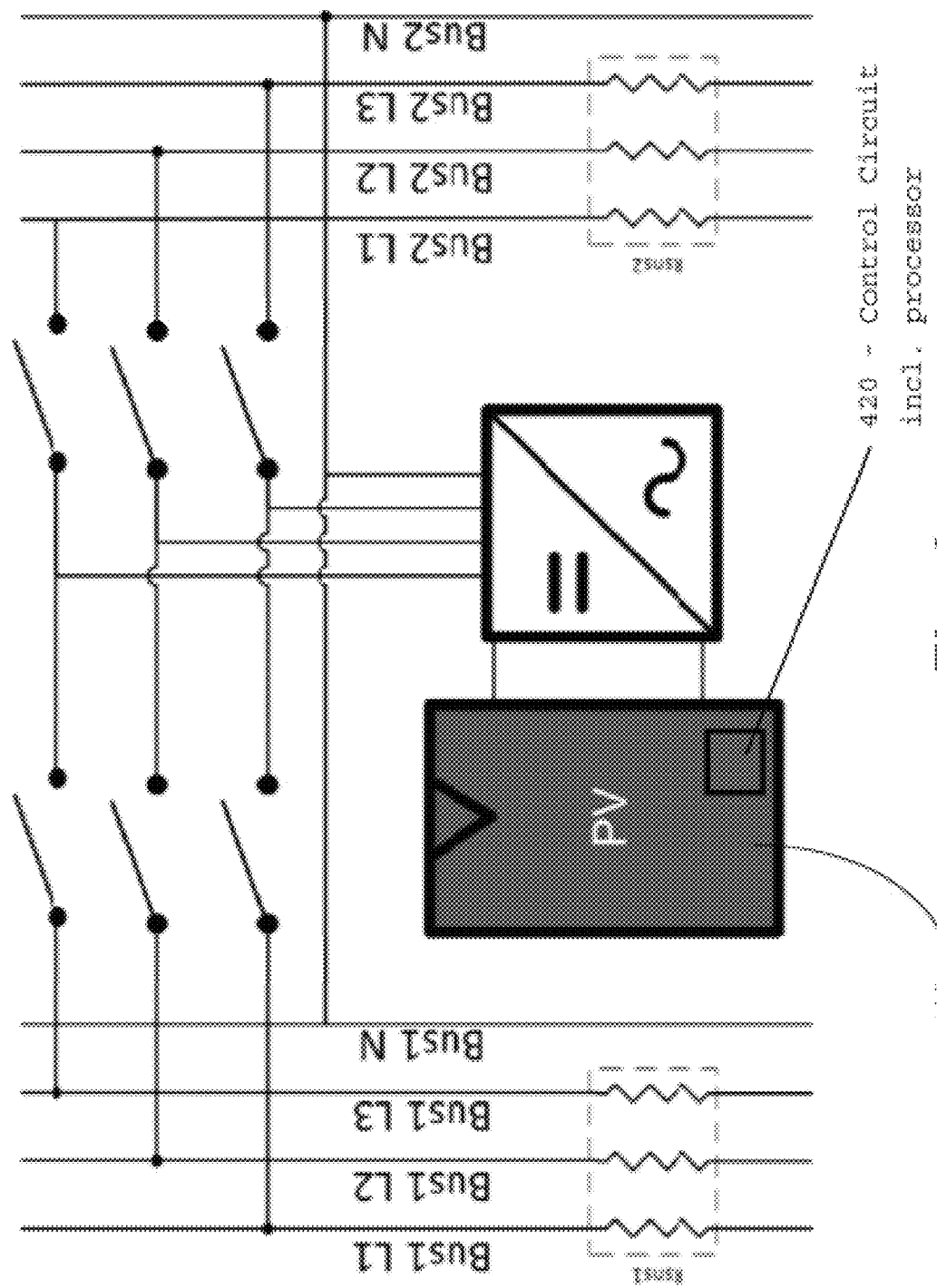
FIG. 4 illustrates an example of switched PV module and 3-phase inverter according to one or more aspects of the disclosed subject matter.
Figure 5:
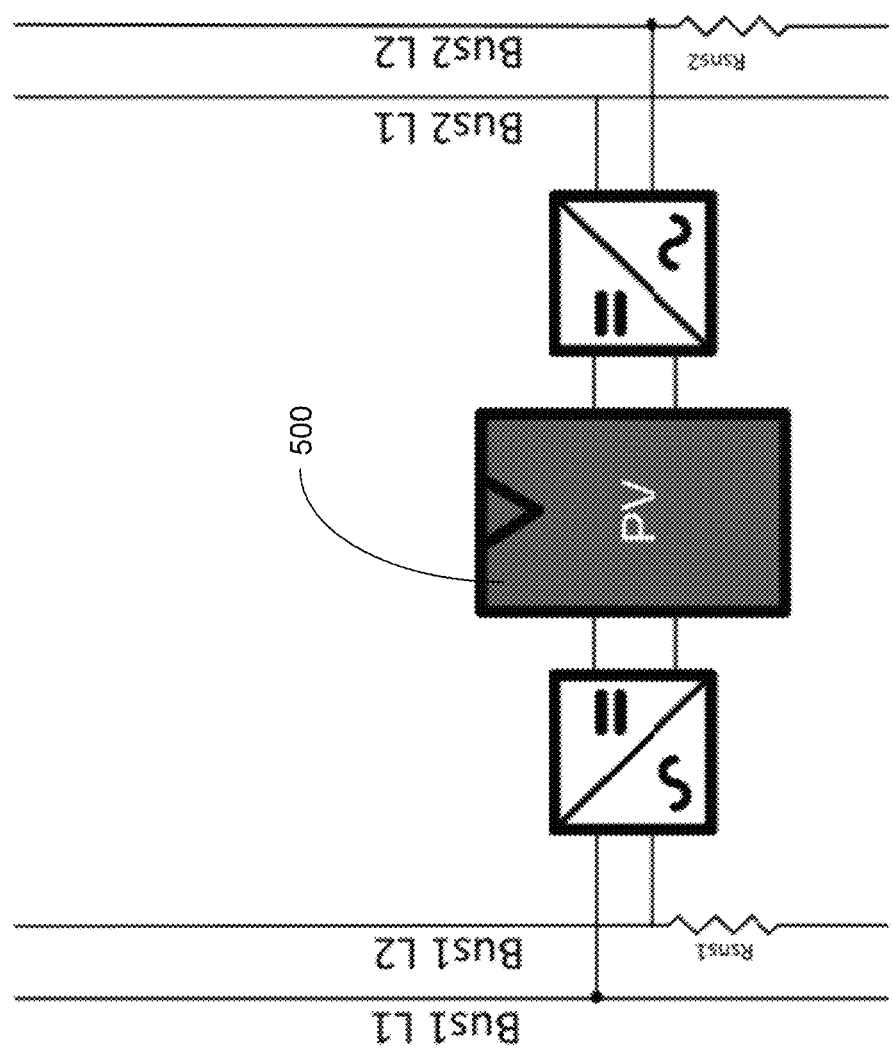
FIG. 5 illustrates an example of PV module with two inverters according to one or more aspects of the disclosed subject matter.

FIG. 4 shows a PV module 400 with a three-phase inverter. Similar to the configuration in FIG. 3, switches are used to attach the inverter to one bus or the other. In an example, the current in the 3-phase bus is considered balanced, then one phase current is measured. FIG. 4 also contains a control circuit with processor 420, which may be configured to control switches and flows generated by PV module 400. FIG. 5 shows a PV module 500 with two single-phase inverters, one attached to each bus. In this configuration, current can be injected onto either bus simultaneously. If the inverters are bidirectional, current can be routed from one bus to the other.

Figure 6:
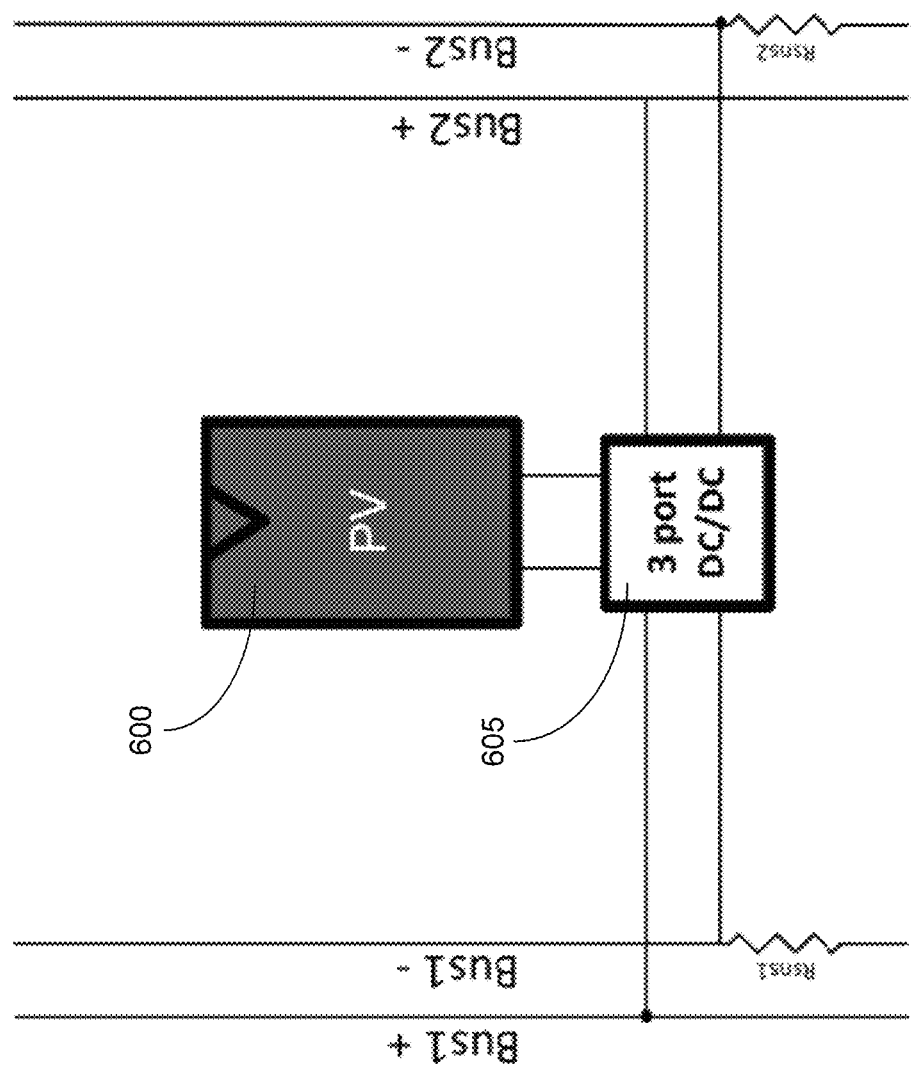
FIG. 6 illustrates an example of PV module with a 3-port converter according to one or more aspects of the disclosed subject matter.

FIG. 6 shows a PV module 600 with a 3-port converter 605. This converter allows for current to be injected onto either bus simultaneously. If the two bus-connected ports are bidirectional, current can be routed from one bus onto the other to help balance current in the busses.

Figure 7:
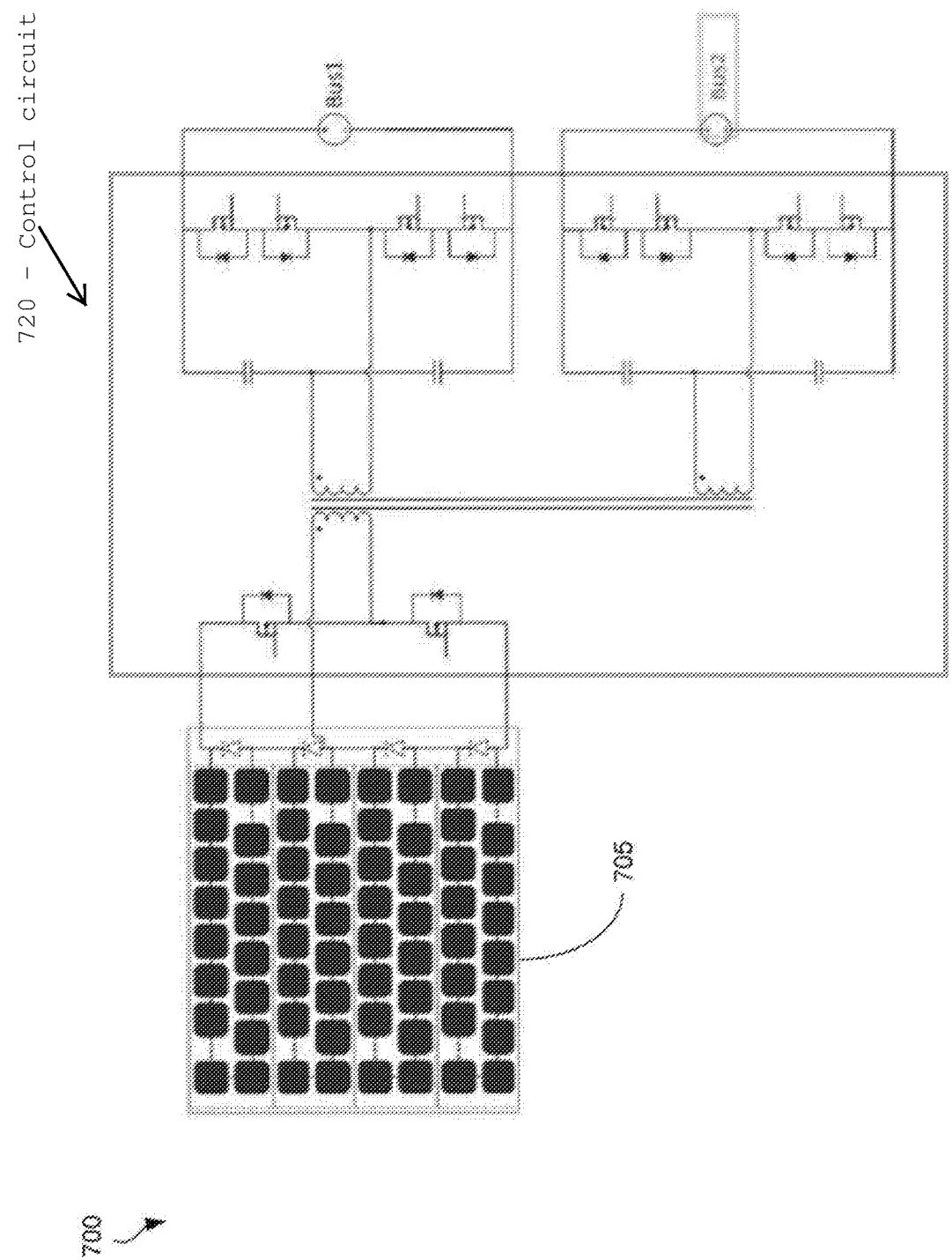
FIG. 7 illustrates an example of three port PV converter according to one or more aspects of the disclosed subject matter.

FIG. 7 shows a circuit diagram 700 for a 3-port converter. This 3-port converter has common-source MOSFET pairs to block voltage in both directions making it possible to attach to an ac bus. The topology can be used for a dc bus as well and, in an example, one MOSFET from the common-source pair is used. The 3-port converter may comprise a control circuit 720 so that output from the PV array may be available at bus 1 or bus 2.

Figure 8:
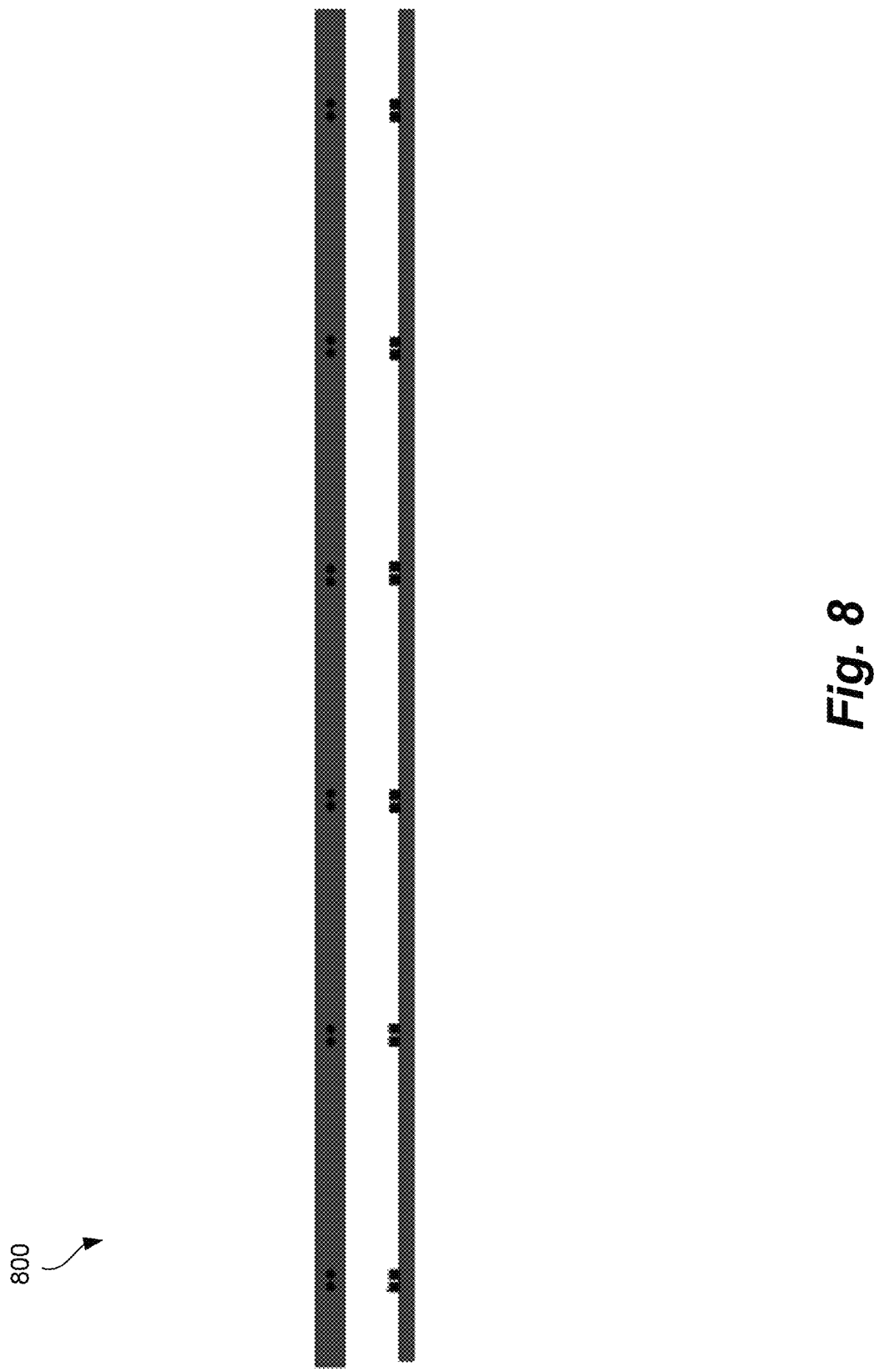
FIG. 8 illustrates an example of PV array collector according to one or more aspects of the disclosed subject matter.

In order to collect the PV array current (e.g., from PV array 705), a set of conductors is used to bridge the individual busses together in an example. FIG. 8 shows a PV array collector 800. The PV array collector 800 is placed under the lower edge of the shingles in the array. It has plugs to match the sockets on the underside of the shingles.

Figure 9:
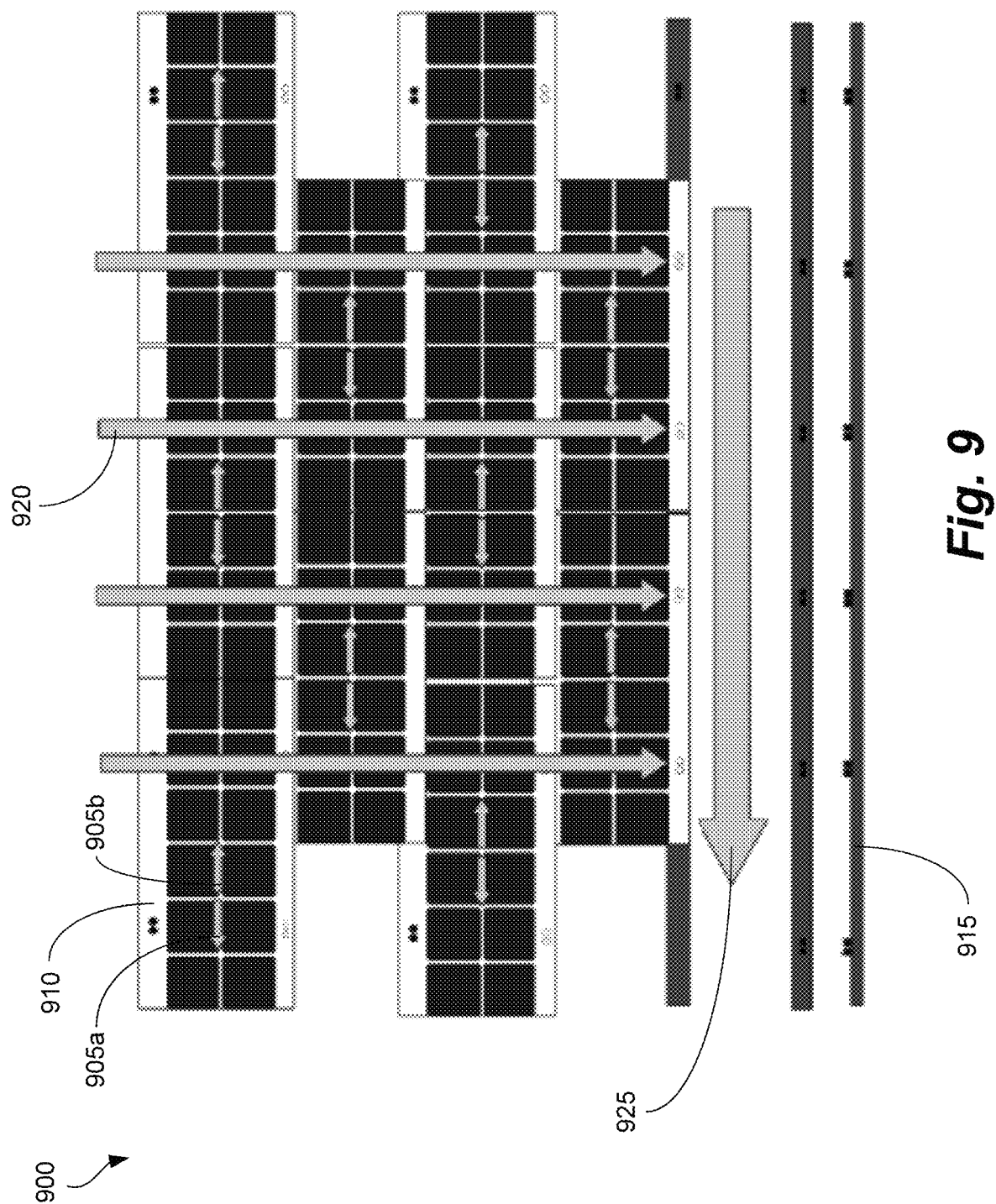
FIG. 9 illustrates an example of current flow in proposed PV array according to one or more aspects of the disclosed subject matter.

FIG. 9 shows an example of current flowing through a PV array 900. The smallest arrows (e.g., arrows 905a, 905b) show the current from the solar shingle 910. It should be appreciated that the current from each solar shingle in the PV array 900 is illustrated as the current from the solar shingle 910 is illustrated. In this figure, the electronics in the solar shingle can direct the current to the right or the left where it is collected in a bus. The current is injected onto the bus with lower current. The current from the bus then flows down into a PV array collector 915 as indicated by arrow 920. From the PV array collector 915, the current flows out toward the rest of the system where it may be attached to an inverter or the grid as indicated by arrow 925.

The electronics can inject current into either bus. One control method is to inject the PV shingles current onto the bus with the lowest current. Another is to divide the current equally unless the current limit is hit and then the PV shingle will inject more current into the lower current bus. For bidirectional converters, some current on one bus can be injected onto the other to help keep the system better balanced. In an example, when the current limit is reached on both busses, the PV shingle will not inject any current.

Figure 10:
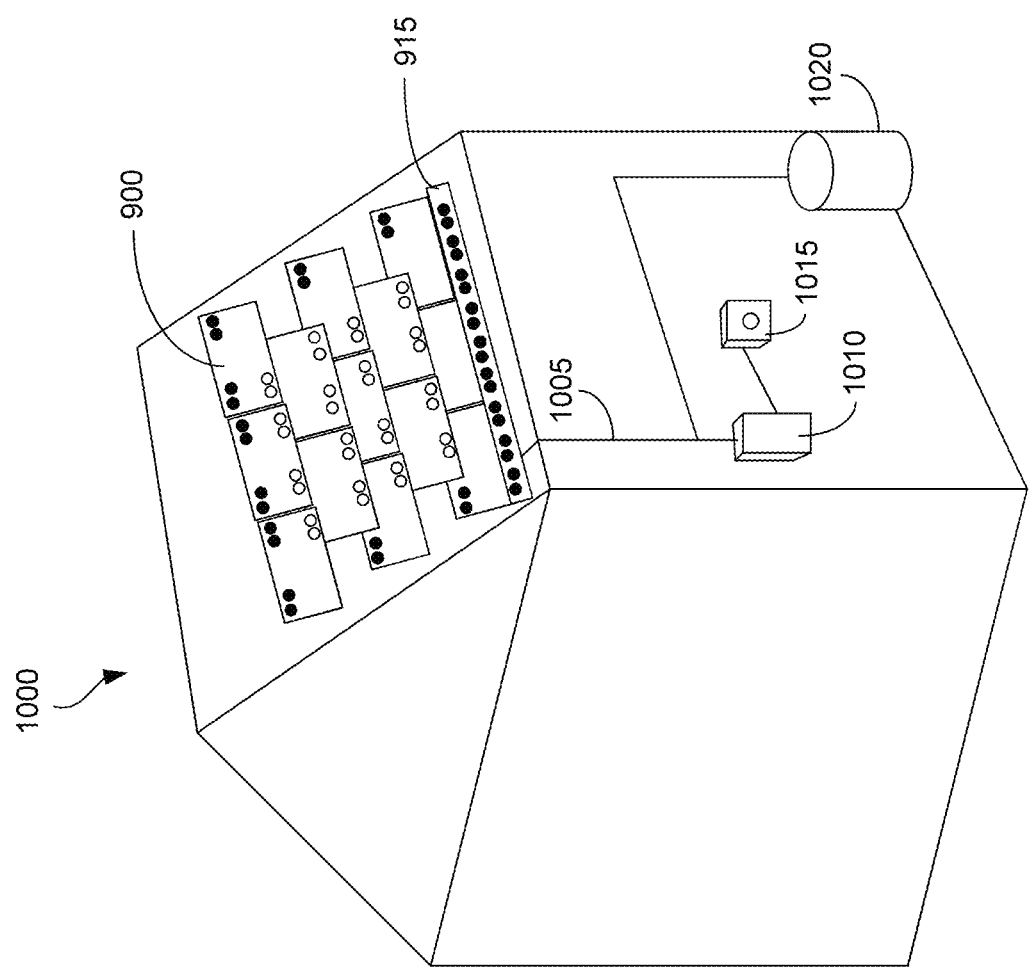
FIG. 10 illustrates a diagram of a power router example according to an embodiment of the disclosure according to one or more aspects of the disclosed subject matter.

FIG. 10 illustrates a power router system 1000 according to one or more aspects of the disclosed subject matter. The power router system 1000 can include a PV array (e.g., PV array 900) connected to a PV array collector (e.g., PV array collector 915). The PV array 900 can direct current to the PV array collector 915 as described herein. For example, the current can be routed through the PV array 900 by dc optimizers. The PV array collector 915 can route current to an inverter 1010, and the inventor can be attached to a meter 1015. The current can also be routed to a power grid (e.g., power grid 1020).

With this BIPV solution, the PV shingle system is easy to design and install. Wiring is easily packaged into a flat shingle. Current is automatically handled by electronics with the PV shingle. Electrical installation and mechanical installation are done in one step. With all these features, this disclosure should help the adoption of BIPV.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A solar shingle system, comprising:
a plurality of solar shingles, each shingle comprising one or more current generation cells configured to generate electric current;
wherein at least a first solar shingle of the plurality of solar shingles comprises a plurality of current buses; and
wherein at least the first shingle of the plurality of shingles comprises a control circuit with a processor, the processor configured to distribute the generated electric current to one or both of the plurality of current buses of the first shingle of the plurality of solar shingles.

2. The solar shingle system of claim 1, wherein the one or more current generation cells are photovoltaic (PV) solar cells configured to convert solar energy into electric energy to generate the electric current.

3. The solar shingle system of claim 1, wherein the plurality of current buses of the first solar shingle comprises:
a first current bus having a first input connector and a first output connector; and
a second current bus having a second input connector and a second output connector.

4. The solar shingle system of claim 3, wherein the first input connector is coupled to a second solar shingle of the plurality of solar shingles and the second input connector is coupled to a third solar shingle of the plurality of solar shingles.

5. The solar shingle system of claim 4, wherein the first output connector is also coupled to a fourth solar shingle of the plurality of solar shingles and the second output connector is also coupled to a fifth solar shingle of the plurality of solar shingles.

6. The solar shingle system of claim 1, wherein the control circuit processor is configured to distribute the electric current to one or both of the plurality of current buses of the first shingle of the plurality of solar shingles, to balance current flowing in the plurality of current buses.

7. The solar shingle system of claim 1, wherein the control circuit processor is configured to distribute the electric current to one or both of the plurality of current buses of the first shingle of the plurality of solar shingles, based on current measurements on the current buses of the first shingle of the plurality of solar shingles.

8. The solar shingle system of claim 1, wherein the control circuit comprises:
a first switch, the first switch is configured to couple current generation cells of the first shingle to a first current bus;
a second switch, the second switch is configured to couple the one or more current generation cells of the first shingle to a second current bus; and
the processor.

9. The solar shingle system of claim 1, wherein the control circuit comprises an inverter circuit.

10. The solar shingle system of claim 1, wherein the control circuit comprises a converter circuit.

11. A solar shingle system, comprising:
one or more solar shingles, each solar shingle comprising
one or more current generation cells configured to generate electric current,
a plurality of current buses, and
a plurality of switches configured to
distribute the generated electric current to the plurality of current buses, and
route the generated electric current to one or more adjacent solar shingles; and an array collector electrically connected to the one or more solar shingles, the array collector being configured to collect the generated electrical current from the one or more solar shingles and direct the generated electrical current to an inverter or a power grid.

12. The solar shingle system of claim 11, wherein the one or more current generation cells are solar cells configured to convert solar energy into electric energy to generate the electric current.

13. The solar shingle system of claim 11, wherein the plurality of current buses comprise:
   a first current bus having a first input connector and a first output connector; and
   a second current bus having a second input connector and a second output connector.

14. The solar shingle system of claim 13, wherein the first input connector and the second input connector are respectively coupled to two solar shingles.

15. The solar shingle system of claim 14, wherein the first output connector and the second output connector are respectively coupled to another two solar shingles.

16. The solar shingle system of claim 11, wherein the plurality of switches is configured to distribute the electric current to the plurality of current buses to balance current flowing in the plurality of current buses.

17. The solar shingle system of claim 11, wherein the plurality of switches is configured to distribute the electric current to the plurality of current buses based on current measurements on the current buses.

18. The solar shingle system of claim 11, wherein:
   a first switch of the plurality of switches is configured to couple the one or more current generation cells to a first current bus;
   a second switch of the plurality of switches is configured to couple the one or more current generation cells to a second current bus.

19. The solar shingle system of claim 11, wherein the plurality of switches are electrically coupled to an inverter circuit.

20. The solar shingle system of claim 11, wherein the plurality of switches are electrically coupled to a converter circuit.

* * * * *